US011325645B2

(12) United States Patent
Jahrstorfer et al.

(10) Patent No.: US 11,325,645 B2
(45) Date of Patent: May 10, 2022

(54) VEHICLE WITH STEERING ANGLE SENSOR

(71) Applicant: Bourns, Inc., Riverside, CA (US)

(72) Inventors: Johann Jahrstorfer, Munich (DE); Hans Schmotz, Aying (DE)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 16/816,628

(22) Filed: Mar. 12, 2020

(65) Prior Publication Data

US 2020/0290676 A1    Sep. 17, 2020

(30) Foreign Application Priority Data

Mar. 15, 2019 (EP) ..................... 19163099

(51) Int. Cl.
| | |
|---|---|
| *G01D 5/14* | (2006.01) |
| *B62D 15/02* | (2006.01) |
| *G01D 5/20* | (2006.01) |

(52) U.S. Cl.
CPC ....... *B62D 15/0215* (2013.01); *G01D 5/2046* (2013.01)

(58) Field of Classification Search
CPC ...... G01D 5/145; G01D 5/147; G01D 5/2046; G01R 33/09; B62D 15/0215
See application file for complete search history.

(56) References Cited

U.S. PATENT DOCUMENTS

| | | | | |
|---|---|---|---|---|
| 6,335,675 | B1* | 1/2002 | Kakinuma | H01L 43/08 |
| | | | | 257/E43.004 |
| 10,816,611 | B2* | 10/2020 | Kaufmann | G01R 33/07 |
| 2016/0265940 | A1* | 9/2016 | Burgdorf | H02K 11/215 |
| 2018/0031643 | A1* | 2/2018 | Kaufmann | G01R 33/0011 |
| 2018/0245947 | A1* | 8/2018 | Ausserlechner | G01D 5/04 |
| 2019/0233008 | A1* | 8/2019 | Andreas | B62D 15/0215 |

FOREIGN PATENT DOCUMENTS

| | | |
|---|---|---|
| DE | 102005007307 A1 | 8/2006 |
| EP | 0856720 A1 * 8/1998 | ............. G01D 5/145 |
| EP | 3531075 A1 | 8/2019 |

* cited by examiner

*Primary Examiner* — Alesa Allgood
(74) *Attorney, Agent, or Firm* — Michael Best & Friedrich LLP

(57) ABSTRACT

A vehicle comprises a chassis supported by wheels for moveably carrying the chassis in a driving direction, a steering wheel for turning a steering column around a rotation axis, and a steering angle sensor for measuring a rotation angle of the steering column with an encoder that is stationary to the steering column and with a magnet sensor that is disposed axially displaced from the encoder on the rotation axis. The encoder includes a first magnet with a top side directed to the magnet sensor and a second magnet attached to the first magnet opposite to the top side. The first magnet includes a recess starting from the top side, and each magnet is magnetized orthogonal to the rotation axis. The first magnet and the second magnet are displaced against each other in rotation direction. The recess has a depth lower than an axial thickness of the first magnet.

20 Claims, 5 Drawing Sheets

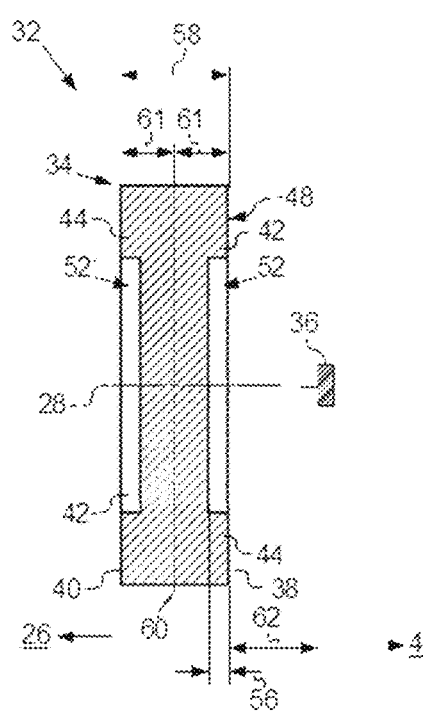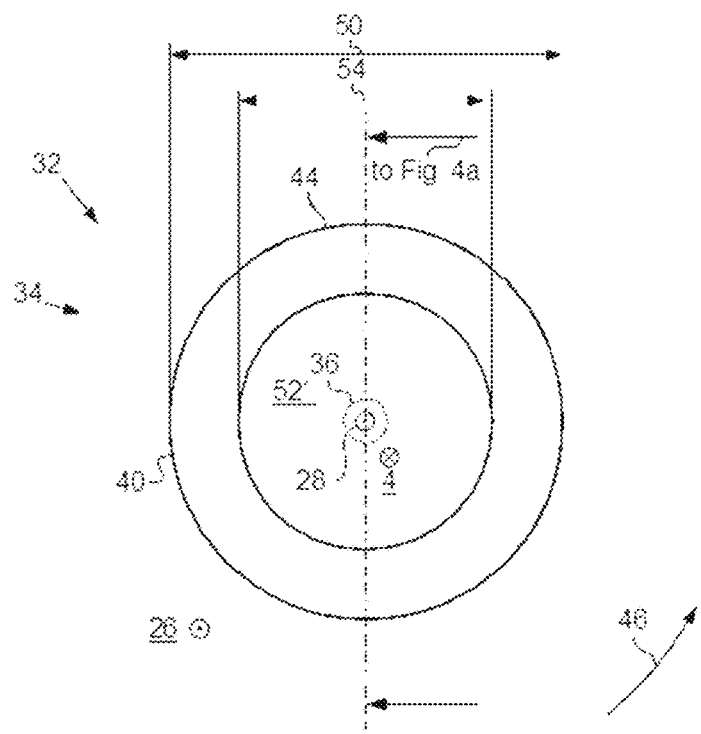
Fig. 4a
Fig. 4b

VEHICLE WITH STEERING ANGLE SENSOR

BACKGROUND

The present embodiments relate to a vehicle having a steering angle sensor.

One type of vehicle is disclosed in German patent application DE 10 2018 102 184, which published as EP3531075A1.

It is an object of the invention to improve the vehicle having a steering angle sensor.

SUMMARY

According to one embodiment of the arrangement, a vehicle comprises a chassis that is moveable in a driving direction, two rear wheels moveably carrying the chassis on the rear side seen in the driving direction, two front wheels moveably carrying the chassis on the front side seen in the driving direction, a steering wheel for turning a steering column around a rotation axis for steering the front wheels, and a steering angle sensor for measuring a rotation angle of the steering column around the rotation axis with an encoder that is stationary to the steering column and with a magnet sensor that is disposed axially displaced from the encoder on the rotation axis, wherein the encoder includes a first magnet with a top side directed to the magnet sensor and a second magnet attached to the first magnet opposite to the top side, wherein at least the first magnet includes a recess starting from the top side, wherein each magnet is magnetized orthogonal to the rotation axis, and wherein regarding from the magnetizations, the first magnet and the second magnet are displaced against each other in rotation direction.

In the vehicle according to another embodiment, the recess has a depth that is lower than an axial thickness of the first magnet. This is based on the thought that, in the vehicle mentioned in the beginning, the encoder having a recess through at least one of the magnets generates magnet lines that are strongly in-parallel. These in-parallel magnet lines are responsible for a non-linear angular error in the steering angle sensor dependent from an air gap between the encoder and the magnet sensor, wherein this angular error is in combination with the off-axis misalignment minimal at a specific distance of the encoder from the magnet sensor. As a consequence, the tolerances for placing the encoder relative to the magnet sensor must be chosen closely, as otherwise, the before mentioned angular error gets too high for a reliable measurement. This unnecessarily increases the overall production costs.

Stopping the recess already in the first magnet leads to the effect that the magnet lines generated by the encoder run more parallel to each other. This reduces the above-mentioned non-linearity of the angular error and allows to place the encoder and the magnet sensor with higher tolerances to each other.

In an embodiment of the provided vehicle, a ratio between the axial thickness of the first magnet and the depth of the recess is larger than 1:20 but lower than 1:2, preferably lower than 1:5. Within these ranges, the steering angle sensor achieves a good sensitivity to reliably measure the rotation angle by keeping the above mentioned idea to keep the angular error as independent as possible from the distance between the encoder and the magnet sensor.

In an additional embodiment of the provided vehicle, the recess of the second magnet includes a bottom side opposite to the first magnet and wherein a further recess is formed into the second magnet starting from the bottom side and extending to the first magnet, wherein the recess and the further recess can be formed symmetrically with respect to a plane separating the first magnet from the second magnet.

In another embodiment of the provided vehicle, the first magnet and the recess have a circular shape seen in the axial direction, wherein a ratio between a diameter of the first magnet and a diameter of the recess is preferably higher than 4:3 and lower than 2:1, more preferably higher than 3:2 and lower than 5:3 and most preferably about 11:7.

In a further embodiment of the provided vehicle, the first magnet is a permanent magnet with a residual induction between 250 millitesla (mT) and 350 mT, preferably with a with a residual induction of 300 mT.

The above described characteristics, features and advantages of this invention as well as the manner and way how they are achieved will become apparent by consideration of the detailed description and accompanying drawings.

BRIEF DESCRIPTION OF THE DRAWINGS

FIG. 4a is the steering angle sensor of FIG. 3 in a sectional view.

FIG. 4b is the steering angle sensor of FIG. 3 in a bottom view.

DETAILED DESCRIPTION

Before any embodiments are explained in detail, it is to be understood that the embodiments are not limited in application to the details of construction and the arrangement of components set forth in the following description or illustrated in the following drawings. Other embodiments are capable of being practiced or of being carried out in various ways.

In the figures, equal technical elements will be provided with equal reference signs and described only one time. The figures are only of schematic nature and do not disclose any real geometric dimension.

Figure 1:
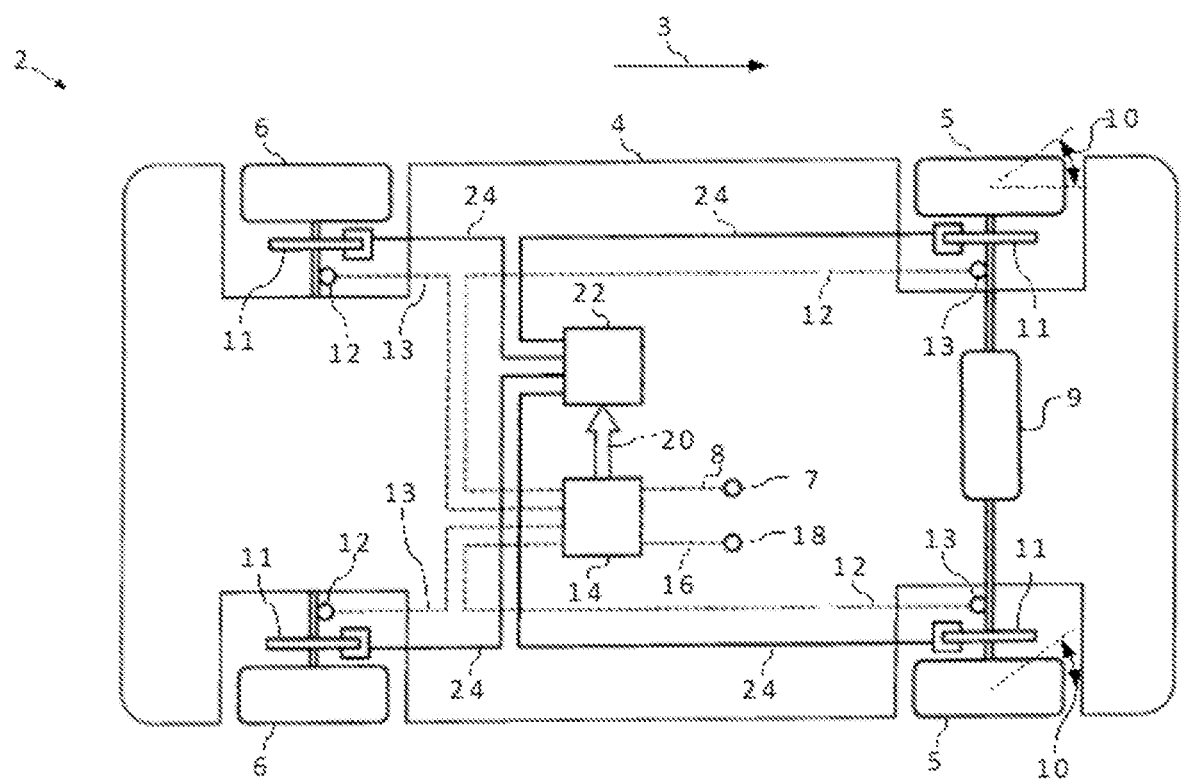
FIG. 1 is a principle schematic of a car with a driving dynamic control.

FIG. 1 shows a schematic view of a vehicle 2 with a basically known driving dynamic control. Details to this driving dynamic control can be taken from DE 10 2011 080 789 A1.

The vehicle 2 is movable in a driving direction 3 and comprises a chassis 4 that is in the driving direction 3 movably carried on two front wheels 5 and two rear wheels 6. Each wheel 5, 6 can be slowed down via a brake 11 that is stationary fixed at the chassis 4 to slow down the movement of the vehicle on a street that is not shown in the figures.

The driving direction 3 during the movement of the vehicle 2 can be controlled by a driver of the vehicle 2 by positioning a steering wheel 7 that is symbolically indicated in FIG. 1 into a steering angle 8. The steering wheel 7 itself controls based on the steering angle 8 a steering gear 9 that adjusts a wheel angle 10 of the front wheels 5 based on the steering angle 8. Based on the variation of the steering angle 8 in time, the vehicle 2 runs a trajectory on the street that is defined by the driver of the vehicle.

During the movement of the vehicle 2 it may occur in a manner that is basically known to the skilled person in the art that the wheels 5, 6 lose their contact to the street and deviates from the trajectory defined by the driver. To prevent such a behavior, the vehicle 2 is provided with the before mentioned vehicle dynamic control.

The vehicle dynamic control includes a brake 11 and wheel speed sensor 12 at each wheel 5, 6. The wheel speed sensor 12 measures the wheel speed 13 of each wheel and provides it to a controller 14. The controller 14 further receives inertial data 16 like a gear rate of the vehicle 2 from an inertial sensor 18 and calculates based on these data the measured driving direction. Then, the controller 14 determines whether the measured driving direction corresponds to the steering angle 8 defined by the driver. In case of any deviations, the controller 14 outputs a control signal 20 to a actuator 22 that individually controls the brakes 11 with suitable actuator signals 24 to correct the driving direction 3 of the vehicle.

Figure 2:
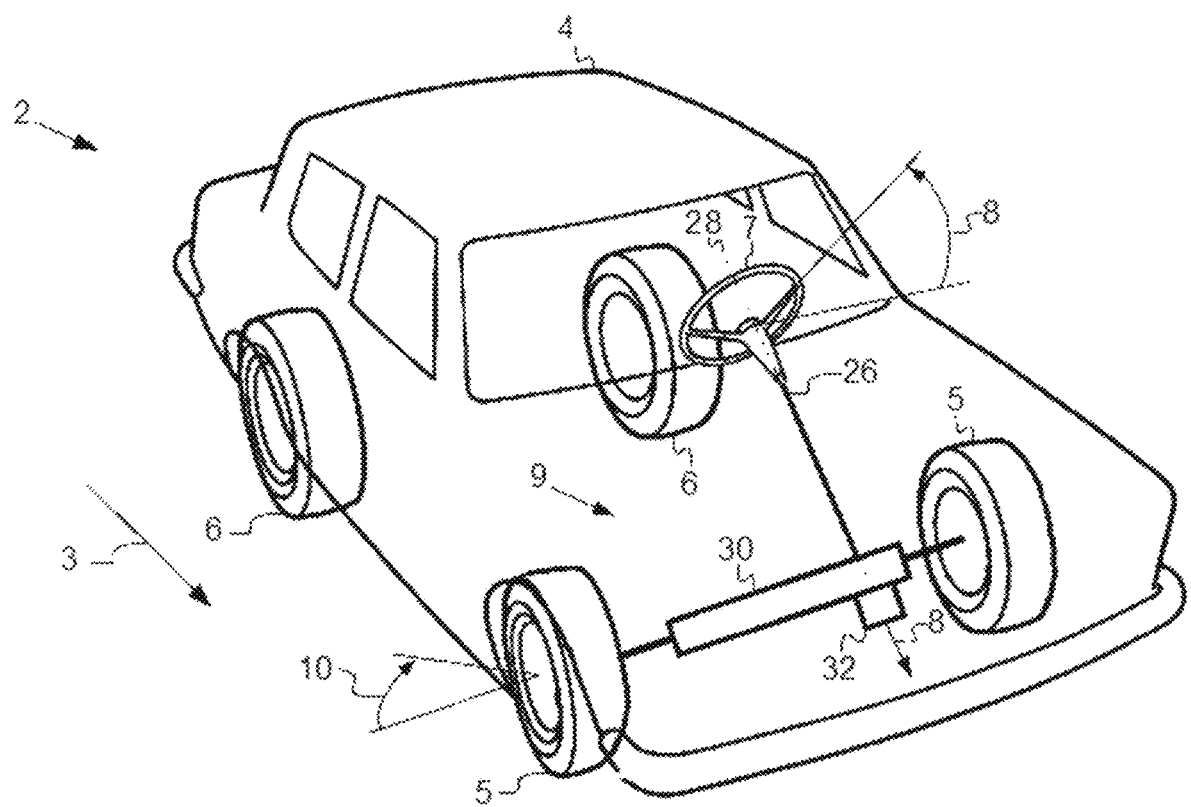
FIG. 2 is a principle schematic of the car of FIG. 1 in a perspective view.

Reference is taken to FIG. 2 to roughly explain the steering mechanism in the vehicle 2. To not unnecessarily complicate the following explanations, a lot of technical elements as e.g. active steering elements or the like are omitted. Details for understanding a steering mechanism can be taken e.g. from DE 10 2005 007 307 A1.

When the driver positions the steering wheel 7 in the steering angle 8, the steering wheel 7 turns a steering column 26 around a rotation axis 28 that itself moves a steering rod 30 for turning the front wheels. That is, the rotation angle of the steering column 26 around the rotation axis 28 corresponds to the steering angle 8, such that when the rotation angle of the steering column 26 is measured, the steering angle 8 of the steering wheel 7 is known.

In the present embodiment, there is a steering angle sensor 32 attached to the axial end of the steering column 26 opposite to the steering wheel 28. This steering angle sensor 32 measures the rotation angle of the steering column 26 and therewith the steering angle 8.

Figure 3:
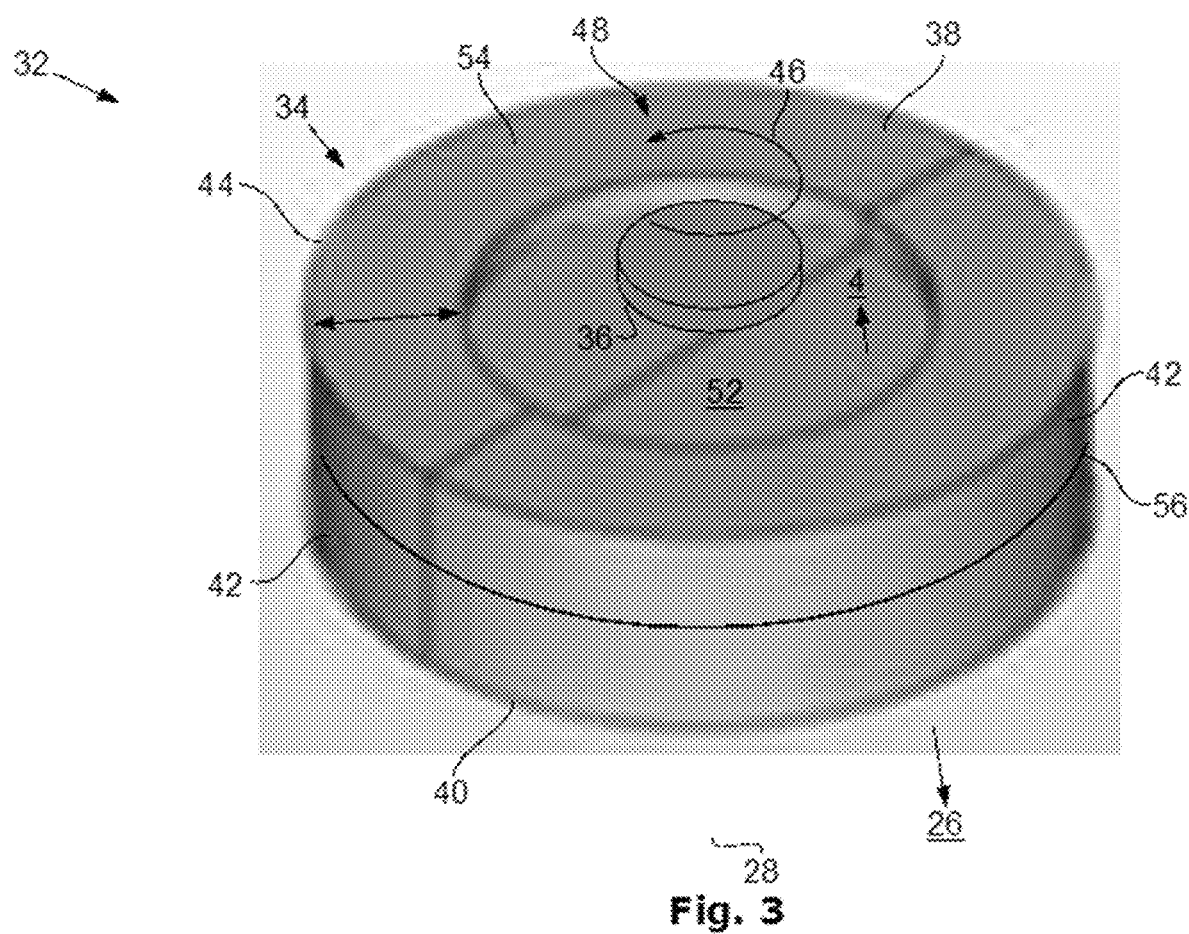
FIG. 3 is a principle schematic of a steering angle sensor in the car of FIG. 1 and FIG. 2 in a perspective view.

Based on FIGS. 3 to 4b, this steering angle sensor 32 is described in further detail.

The steering angle sensor 32 comprises an encoder 34 that is stationary to the steering column 26 and a magnet sensor 36 that is stationary to the chassis 4 of the vehicle 2. The fixation of these components within the vehicle 2 is indicated by arrows in FIGS. 3 to 4b.

The encoder 34 comprises a first magnet 38 and a second magnet 40. Both magnets 38, 40 are formed as a circular disc that is magnetized in a direction perpendicular to the rotation axis, such that one disc half of each magnet 38, 40 is the north pole 42 and the other disc half of each magnet 38, 40 is the south pole 44. Both magnets 38, 40 are stacked on each other and aligned to the rotation axis 28. Therein, the north pole 42 of one magnet 38, 40 is placed on the south pole 44 of the other magnet 40, 38 and vice versa, such that both magnets 38, 40 are displaced in a rotation direction 46 around the rotation axis 28.

The description of the encoder 34 as composed based on two separated magnets 38, 40 is only figurative to comprehensively explain the construction of the encoder 34. The encoder 34 can also be a single magnetizable piece, wherein the north and south poles 42, 44 are introduced with a suitable magnetization method.

The first magnet 38 has a top surface 48 that is directed to the magnet sensor 36. The top surface 48 of the first magnet 38 is not visible in the perspective of FIG. 4b. The second magnet 40 is attached to the first magnet 38 opposite to the top surface 48. Seen from the rotation axis 28, the encoder 34 has a circular shape with an encoder diameter 52 of 11 mm.

The first magnet 38 of the encoder 34 includes a recess 52 that has seen in the direction of the rotation axis 28 a circular shape with a recess diameter 54 of 7 mm. The recess 52 is formed with a recess depth 56 of 0.55 mm, while the complete encoder 34 has seen in the rotational axis 28 an encoder height 58 of 3 mm.

Likewise to the first magnet 38, in the present embodiment, the second magnet 40 of the encoder 34 also includes a recess 52' that is formed symmetrically into the second magnet 40 with respect to a section plane 60 separating the first magnet 38 from the second magnet 40. As an intrinsic requirement of this feature, both magnets have a same magnet thickness 61 in the direction of the rotation axis 28 of 1.5 mm.

The encoder 34 generates a magnetic field that is not visible in FIGS. 3 to 4b. The magnetic field varies around the rotation axis 28, such that a rotation of the encoder 34 around the rotation axis 28 changes the magnetic field from the view of the magnetic sensor 36. That is, based on the change of the magnetic field, the magnetic sensor 36 can derive the rotation angle of the steering column 26.

To measure the magnetic field, the magnetic sensor 36 is placed in a measurement distance 62 from the top side 48 of the encoder 34. This measurement distance 62 however has an impact on an angular error in the rotation angle to be measured. The angular error always exists and defines thus a tolerance, by which the magnetic sensor 36 can be placed relatively to the encoder 34. The higher the impact of the angular error in the rotation angle to be measured is, the closer the tolerance must be chosen, which in turn leads to higher production costs. In other words, it is preferred to make the angular error as independent as possible from the measurement distance 62.

Figure 5:
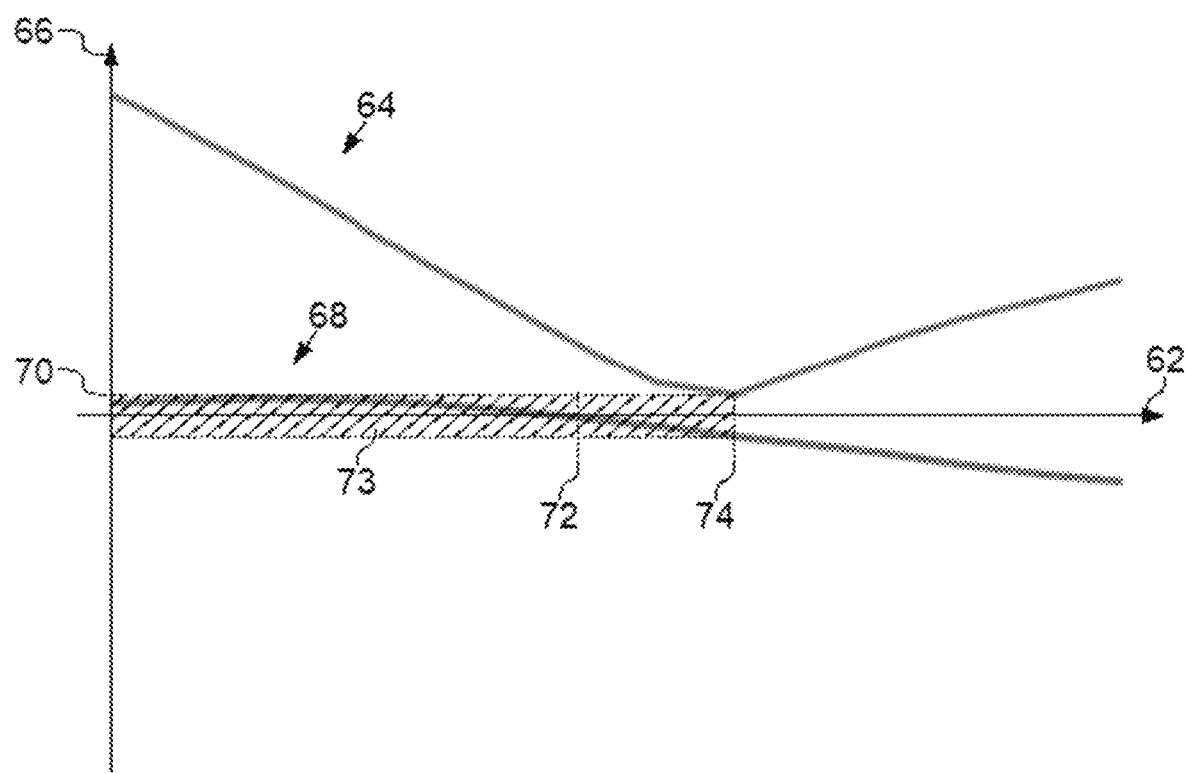
FIG. 5 is a diagram with measurement results.

To discuss the angular error of the angle sensor 32 according to the present embodiment, reference is taken to FIG. 5 that shows a diagram, in which a first developing 64 or plot line of a maximal angular error 66 and a second developing 68 or plot line of a maximal angular error 66 over the measurement distance 62 is drawn. These measurements were taken for a residual induction of 300 mT.

The first developing 64 belongs to a known angle sensor that is described in DE 10 2018 102 184. At a measurement distance 62 of zero, the known angle sensor outputs angle results with a comparatively high maximal angular error 66 that rapidly falls with an increasing measurement distance 62 until a minimum error 70 at an optimum distance 72. After this minimum error 70, the maximal angular error 66 raises in the known angle sensor. To get reliable measurements for the rotation angle to be measured with the known angle sensor, the measurement distance 62 must be chosen at the optimum distance 72 and due to the comparatively high non-linearity, there are no high tolerances for relative displacement errors between the encoder 34 and the magnetic sensor 36.

The second developing 68 in turn belongs to the angle sensor 32 according to the present embodiment. The measurements clearly show that the maximal angular error 66 in the angle sensor 32 according to the present embodiment keeps below the minimum error 70 for measurement distances 62 in a lower distance range 73 lower than the optimum distance 72. There is even a zero crossing 74 of the maximal angular error 66 indicating that the maximal angular error 66 can be further reduced over the known angle sensor within the lower distance range 73.

It is also clearly visible that the second developing 68 keeps compared to the first developing 64 comparatively constant in the lower distance range 73. That is, the encoder 34 and the magnetic sensor 36 can be basically arbitrarily placed relative to each other within the lower distance range, without significantly running contrary a required maximal angular error. This freedom can be used in dimension for the angle sensor 32 according to the present embodiment with higher tolerances.

Thus, the embodiments provide, among other things, a vehicle having a steering angle sensor with an encoder having at least a first magnet and a second magnet. Various features and advantages are set forth in the following claims.

What is claimed is:

1. A vehicle (2) comprising:
    a chassis (4) that is moveable in a driving direction (3),
    two rear wheels (6) moveably carrying the chassis (4) on a rear side in the driving direction (3),
    two front wheels (5) moveably carrying the chassis (4) on a front side in the driving direction (3),
    a steering wheel (7) for turning a steering column (26) around a rotation axis (28) for steering the front wheels (5), and
    a steering angle sensor (32) for measuring a rotation angle (8) of the steering column (26) around the rotation axis (28) with an encoder (34) that is stationary to the steering column (26) and with a magnet sensor (36) that is disposed axially displaced (72) from the encoder (34) on the rotation axis (28),
    wherein the encoder (34) includes a first magnet (38) with a top side (48) directed to the magnet sensor (36) and a second magnet (40) attached to the first magnet (38) opposite to the top side (48), wherein at least the first magnet (38) includes a recess (52) starting from the top side (48), wherein each magnet (38, 40) is magnetized orthogonal to the rotation axis (28), and wherein regarding from the magnetizations (42, 44), the first magnet (38) and the second magnet (40) are displaced against each other in rotation direction (46), characterized in that
    the recess (52) has a depth (56) that is lower than an axial thickness (61) of the first magnet (38).

2. The vehicle (2) according to claim 1, wherein the recess (50) the second magnet (40) includes a bottom side opposite to the first magnet (38) and wherein a further recess (52') is formed into the second magnet (40) starting from the bottom side and extending toward the first magnet (38), characterized in that the further recess (52') has a depth that is lower than an axial thickness (61) of the second magnet (40).

3. The vehicle (2) according to claim 1, wherein the first magnet (38) is a permanent magnet with a residual induction between 250 mT and 350 mT.

4. The vehicle (2) according to claim 1, wherein a ratio between the axial thickness (61) of the first magnet (38) and the depth (56) of the recess (52) is larger than 1:20 but lower than 1:2.

5. The vehicle (2) according to claim 4, wherein the first magnet (38) is a permanent magnet with a residual induction between 250 mT and 350 mT.

6. The vehicle (2) according to claim 4, wherein the ratio between the axial thickness (61) of the first magnet (38) and the depth (56) of the recess (52) is lower than 1:5.

7. The vehicle (2) according to claim 4, wherein the second magnet (40) includes a bottom side opposite to the first magnet (38) and wherein a further recess (52') is formed into the second magnet (40) starting from the bottom side and extending toward the first magnet (38), characterized in that the further recess (52') has a depth that is lower than an axial thickness (61) of the second magnet (40).

8. The vehicle (2) according to claim 7, wherein the first magnet (38) and the recess (52) have a circular shape seen in the axial direction (28).

9. The vehicle (2) according to claim 7, wherein the first magnet (38) is a permanent magnet with a residual induction between 250 mT and 350 mT.

10. The vehicle (2) according to claim 7, wherein the recess (52) and the further recess (52') are formed symmetrically with respect to a plane (60) separating the first magnet (38) from the second magnet (40).

11. The vehicle (2) according to claim 10, wherein the first magnet (38) is a permanent magnet with a residual induction between 250 mT and 350 mT.

12. The vehicle (2) according to claim 10, wherein the first magnet (38) and the recess (52) have a circular shape viewed in the axial direction (28).

13. The vehicle (2) according to claim 12, wherein a ratio between a diameter (50) of the first magnet (38) and a diameter (54) of the recess (52) is higher than 4:3 and lower than 2.1.

14. The vehicle (2) according to claim 13, wherein the first magnet (38) is a permanent magnet with a residual induction of 300 mT.

15. The vehicle (2) according to claim 13, wherein the ratio between the diameter (50) of the first magnet (38) and the diameter (54) of the recess (52) is higher than 3:2 and lower than 5:3, most preferably about 11:7.

16. The vehicle (2) according to claim 4, wherein the first magnet (38) and the recess (52) have a circular shape seen in the axial direction (28).

17. The vehicle (2) according to claim 16, wherein a ratio between a diameter (50) of the first magnet (38) and a diameter (54) of the recess (52) is higher than 4:3 and lower than 2:1.

18. The vehicle (2) according to claim 1, wherein the first magnet (38) and the recess (52) have a circular shape seen in the axial direction (28).

19. The vehicle (2) according to claim 18, wherein a ratio between a diameter (50) of the first magnet (38) and a diameter (54) of the recess (52) is higher than 4:3 and lower than 2:1.

20. The vehicle (2) according to claim 18, wherein the first magnet (38) is a permanent magnet with a residual induction between 250 mT and 350 mT.

* * * * *